United States Patent
Wolcott et al.

(10) Patent No.: US 9,473,613 B2
(45) Date of Patent: Oct. 18, 2016

(54) COMMUNICATION NETWORK

(71) Applicants: Lawrence D. Wolcott, Denver, CO (US); Kevin Johns, Centennial, CA (US)

(72) Inventors: Lawrence D. Wolcott, Denver, CO (US); Kevin Johns, Centennial, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 583 days.

(21) Appl. No.: 13/740,848

(22) Filed: Jan. 14, 2013

(65) Prior Publication Data
US 2014/0199990 A1 Jul. 17, 2014

(51) Int. Cl.
| | | |
|---|---|---|
| H04W 84/04 | (2009.01) | |
| H04W 84/10 | (2009.01) | |
| H04H 20/81 | (2008.01) | |
| H04W 92/06 | (2009.01) | |
| H04H 20/77 | (2008.01) | |
| H04M 1/725 | (2006.01) | |

(52) U.S. Cl.
CPC ......... *H04M 1/72502* (2013.01); *H04H 20/77* (2013.01); *H04H 20/81* (2013.01); *H04W 92/06* (2013.01); *H04W 84/045* (2013.01); *H04W 84/105* (2013.01)

(58) Field of Classification Search
CPC ............ H04B 10/272; H04B 7/15528; H04B 7/15542; H04B 7/2606; H04M 7/006; H04M 9/27; H04W 24/00; H04W 24/08
USPC .................... 455/450; 725/109, 122–124, 81
See application file for complete search history.

(56) References Cited

U.S. PATENT DOCUMENTS

| | | | |
|---|---|---|---|
| 5,870,392 A | 2/1999 | Ann | |
| 7,587,001 B2 * | 9/2009 | Hazani | H04B 7/15542 235/462.46 |
| 2002/0147978 A1 * | 10/2002 | Dolgonos | H04L 12/1836 725/62 |
| 2008/0132164 A1 | 6/2008 | Bugenhagen et al. | |
| 2008/0151857 A1 | 6/2008 | Dolgonos | |
| 2010/0081442 A1 * | 4/2010 | Kronestedt | H04W 72/082 455/450 |
| 2012/0066724 A1 * | 3/2012 | Zussman | H04Q 11/0067 725/65 |

FOREIGN PATENT DOCUMENTS

EP  14151158.4  1/2014

OTHER PUBLICATIONS

Partial European Search Report—EP14151158.4—Mailing Date: Jun. 6, 2014.
Extended European Search Report—EP14151158.4—Mailing Date: Sep. 22, 2014.
Response to European Office Action—EP 14151158.4—Dated Apr. 22, 2015.

* cited by examiner

*Primary Examiner* — Joseph Dean, Jr.
(74) *Attorney, Agent, or Firm* — Banner & Witcoff, Ltd.

(57) ABSTRACT

A wired network may be used to carry signals for a wireless network, in a frequency-shifted manner, to extend the range of the wireless network. A wired network may detect signal interference emanating from a wireless service provider, and received through a leak in the wired network's infrastructure. Devices may be installed or leveraged in the vicinity of the interference to extend the wireless service to geographic areas that may have poor reception. The devices may amplify wireless downstream signals and transmit them wirelessly, and may receive upstream wireless communications and transmit them upstream in the wired network's protocol.

17 Claims, 10 Drawing Sheets

COMMUNICATION NETWORK

BACKGROUND

Wired networks, such as coaxial cable optical fiber and traditional twisted-pair telephone networks, typically employ a vast network of wiring for carrying communication signals. Users of such networks enjoy a wide array of features and services, but demand for these features and services is neverending; and additional capacities such as using or extending a wireless network are desirable. There remains a constant need to offer greater functionality and wider array of services to users.

SUMMARY

The summary provided herein is merely a summary of illustrative examples, and is not intended to serve as a limitation on the claims or the scope of this disclosure.

The features herein include methods, systems and apparatus for extending coverage of a wireless network to areas that may not be adequately covered by the wireless network's own facilities. In some embodiments, a computing device at a user's premises may receive a wireless signal and transmit a frequency-shifted version of the wireless signal at a frequency on a wired network. The frequency shifting and transmission may be done without the computing device decoding any data from the received wireless signal. Downstream signals may also be received over the coaxial cable and retransmitted wirelessly by the computing device, using a different frequency from one over which the signals were received by the computing device. In this manner, a wired network may be used, for example, to carry frequency-shifted versions of cellular telephone signals. Local wireless transceivers at users' homes may be used to frequency shift the signals and transmit them to (or receive them from) the user's devices such as smart cell phones, such that the cell phones may behave as if they were communicating with a cell tower.

Some embodiments may manage the intrusion of wireless signals into a wired network. In some embodiments, a computing device may be provided to identify geographic areas in which a particular wireless service has poor coverage, and to determine whether the wireless signal can be detected on the wired network in the vicinity of the geographic area. If it can, then one or more local amplifiers may be used or if needed, at the geographic location, to serve as a wireless extension to bring the wireless service into the geographic location.

In some embodiments, a proprietor of the wired network may identify interference signals received on the wired network, and may determine whether the interference is occurring at a frequency being used by any wireless service provider in the area. If it is, then the proprietor of the wired network may offer to install one or more local amplifiers in the area, to improve the wireless coverage of the wireless service provider, as a way to turn a detriment into a potential benefit.

These and other aspects will be described in connection with the drawings.

DETAILED DESCRIPTION

Figure 1:
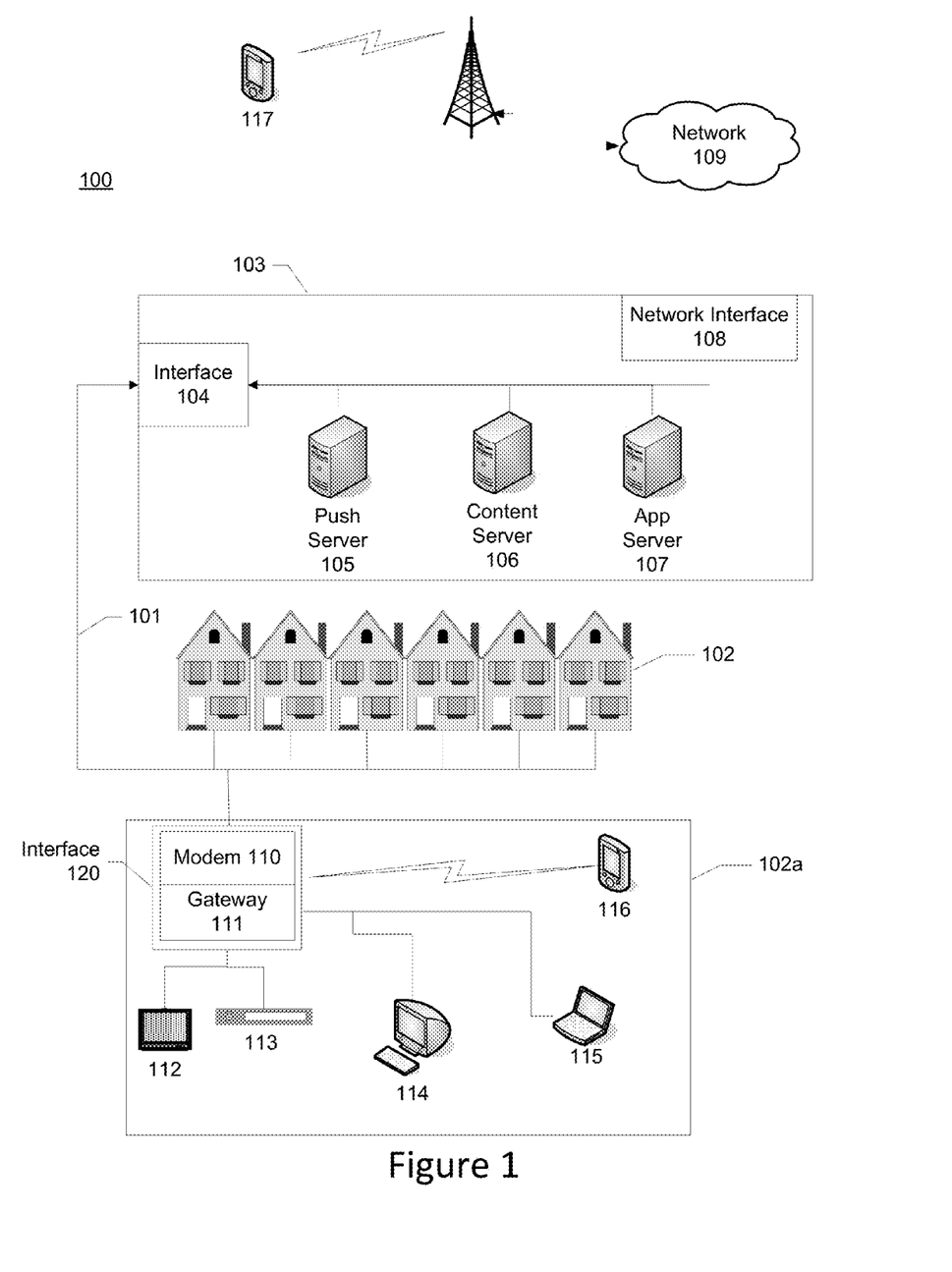
FIG. 1 illustrates an example system on which features described herein may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, central office, a processing facility, etc.). The local office 103 may transmit downstream information signals onto the links 101, and each premises 102 may have a receiver used to receive and process those signals. The geographic location of the local office 103 can vary, and the local office 103 may be proximate to a user's neighborhood in some embodiments, while in other embodiments, the local office 103 may be remotely located at a centralized location. The various servers may be located anywhere, and their location need not be relevant to a user (e.g., the servers may be in the "cloud").

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device configured to manage communications between devices on the network of links 101 and backend devices such as servers 105-7 (to be discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to other devices on the network such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions such as billing, reporting, and subscriber management to deliver data and/or commands to the various premises 102 in the network (or more specifically, to the devices in the premises 102 that are configured to detect such notifications). The local office 103 may also include a content server. The content server 106 may be one or more computing devices that are configured to provide content to users, who may be, for example, in the homes. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements remotely in the network 109.

The local office 103 may also communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, tablet computers, PDA, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 3G, WiMax, LTE, Bluetooth interfaces, and others. In some embodiments, the system uses ZigBee and Z-Wave compliant devices.

Figure 2:
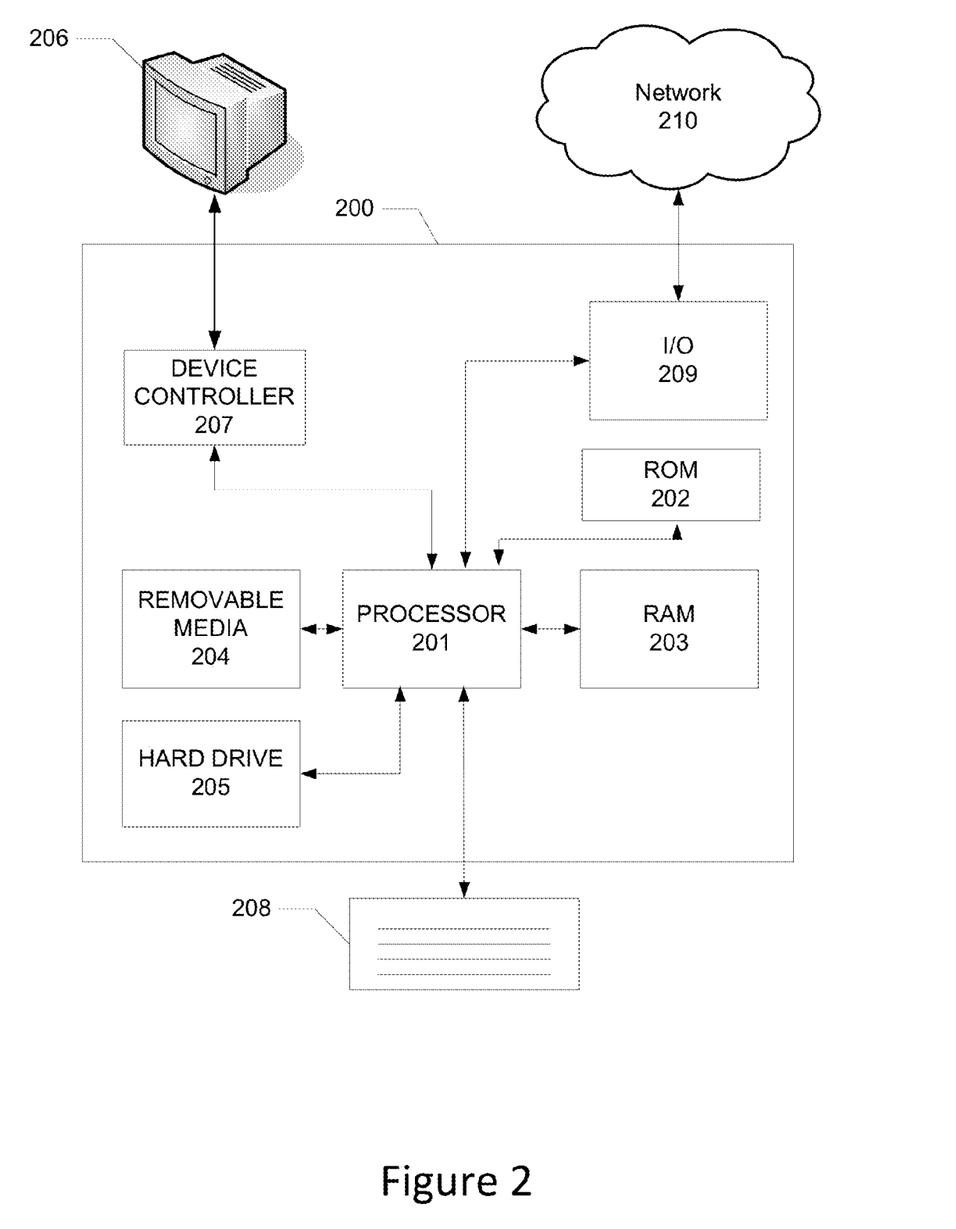
FIG. 2 illustrates an example computing device that may be used to implement any of the computing devices and servers described herein.

FIG. 2 illustrates general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the local office (e.g., processing facility) of an information distribution or access network may transmit information downstream to various user devices. The transmitted information may include content (e.g., audio, video, Internet data, etc.) for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 117 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device) The features herein include techniques, systems, apparatus, and methods for mapping trick modes of operation in connection with the playback of media content wherein the trick modes of operation are mapped to alternate advertising or other media content. The features will be described hereinbelow primarily in connection with an embodiment in a television service network, such as a cable television network. However, it should be understood that this is merely exemplary. The features may be implemented in connection with any form of media content, including audio content, video content, and multimedia content, and in connection with any number of delivery mechanisms for such content, including television networks, media delivered via the Internet or another information network, media stored on any digital medium, including, but not limited to, DVDs, CDs, solid-state memory, and hard disk drives such as found in computers and DVRs.

Figure 3A:
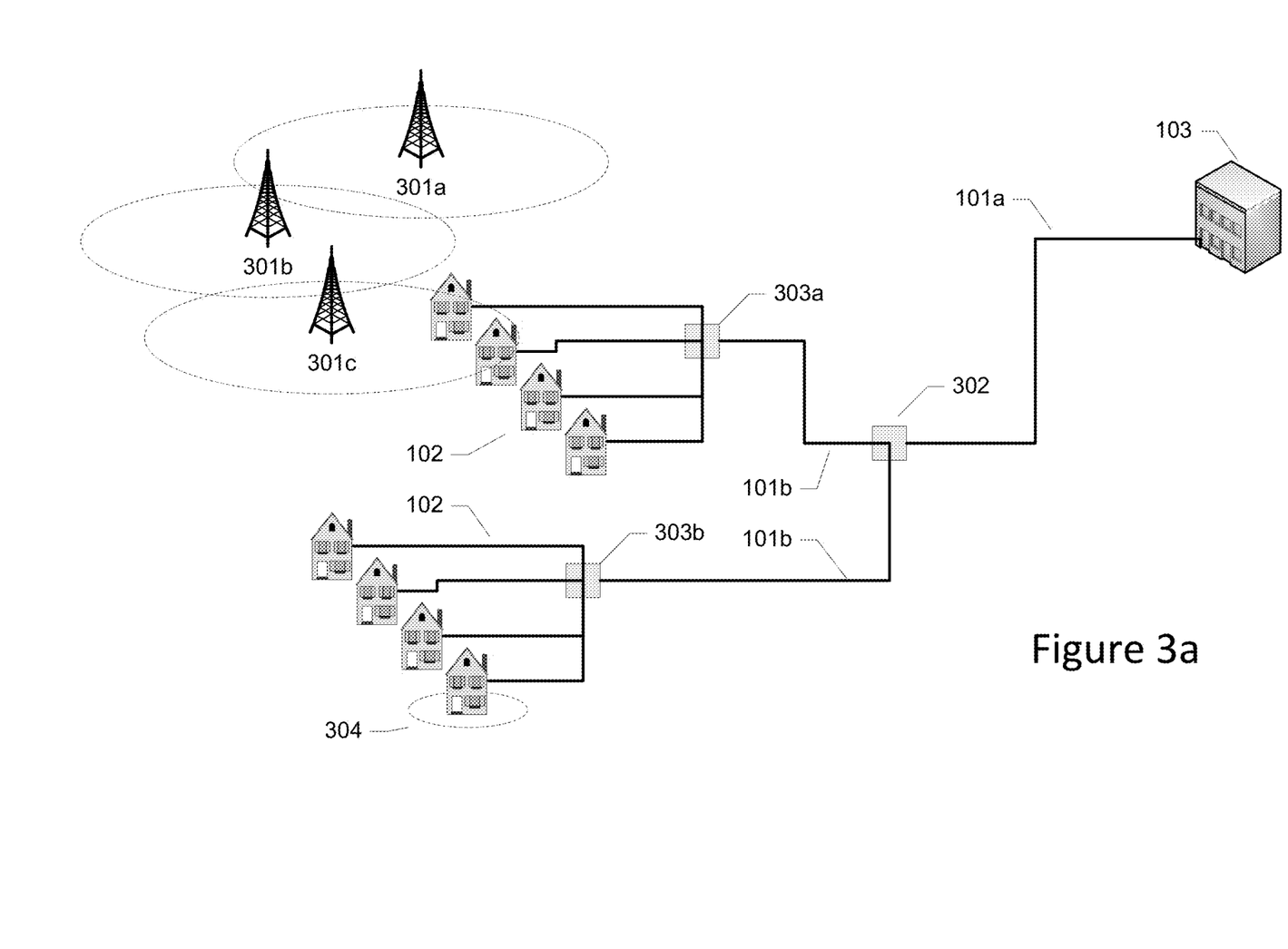
FIGS. 3a and 3b illustrate examples of the FIG. 1 system, with additional components and detail.

FIG. 3a illustrates an example of the system shown in FIG. 1, but with additional components at a different scale. As illustrated, a local office 103 may have a link 101a, such as an optical fiber line, that extends out to an optical fiber node 302. At the node 302, the optical fiber 101a may be terminated at a network interface computing device, and the optical signals may be converted to coaxial cable signals and carried out on coaxial cable lines 101b. The coaxial cable lines 101b may extend out to a series of distribution amplifiers and taps 303a,b, and on to the various premises and homes 102.

A wireless service, such as a Long Term Evolution (LTE) or 4G cellular telephone service, may also offer data services in the same geographic area as the premises and homes 102. For example, cell towers 301a-c may provide ranges of coverage in their vicinity. Some locations, however, lie beyond the wireless reach of the cell towers 301a-c. As illustrated in FIG. 3a, and as will be discussed in further detail below, one of these locations may choose to install local antennas and amplifiers to provide a small range 304 in which the wireless service can function, by having the wireless service's data carried on the wired portions of the network 101a,b.

Figure 3B:
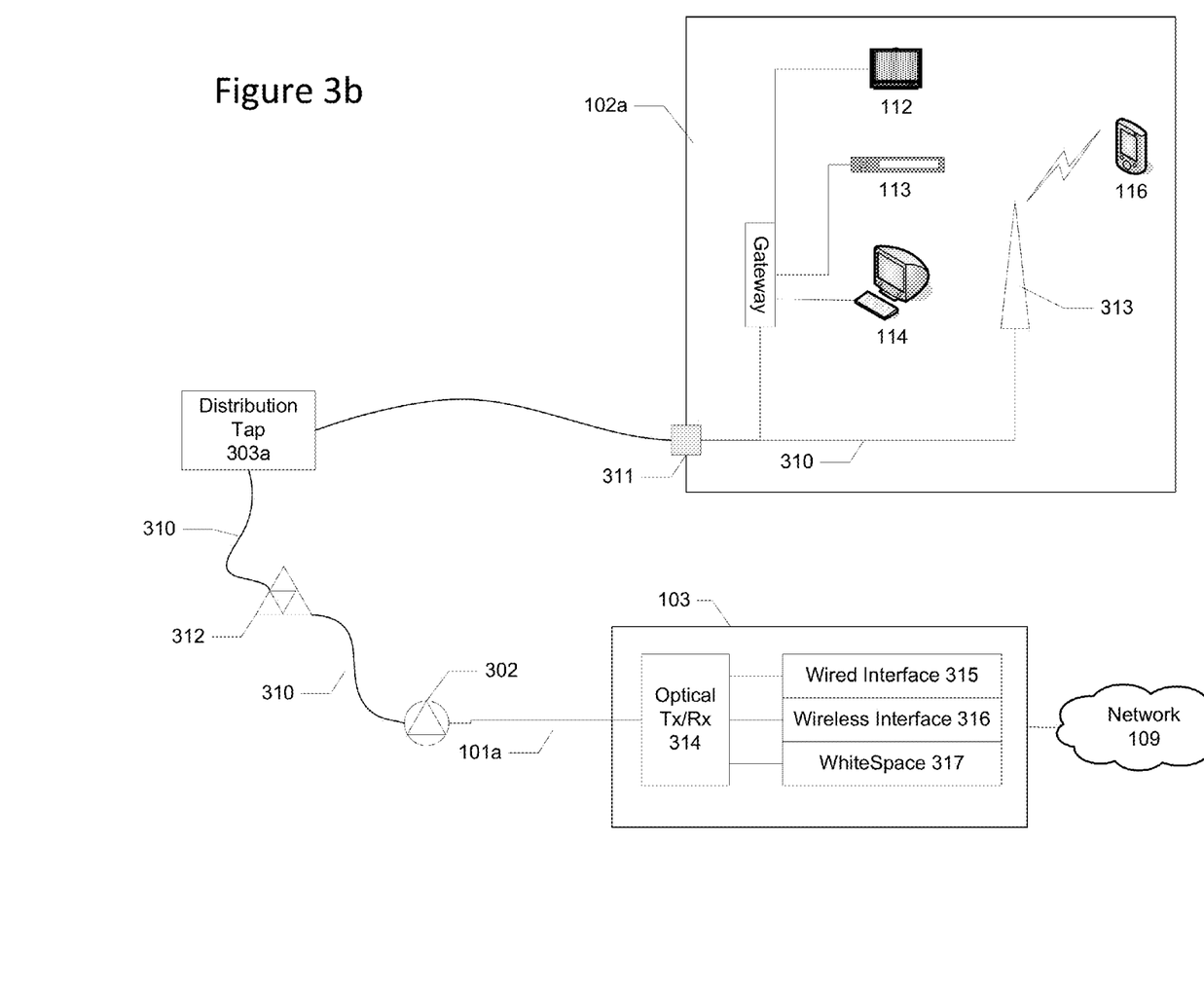

FIG. 3b illustrates an example of the system shown in FIG. 3a, with additional detail. As illustrated an example wired network may include wiring 310 throughout the premises 102a, and beyond the premises 102a out to the remainder of the network. The wiring 310 may be any desired type of wire, such as twisted-pair telephone wiring, coaxial or optical cable, power line, Ethernet, or any other physical media that employs transmission frequencies, such as radio frequencies (RF), to carry data, and may be used to implement the lines 101, 101a and 101b described herein. The wiring 310 may connect to a grounding interface 311 at the premises, and can continue on outside the premises until a local distribution tap 303a. The distribution tap 303a may then be connected to a distribution amplifier 312, which in turn may be connected to an optical fiber node 302, and these connections may use the same type of physical line 101b. The fiber node 302 may convert the signals from the distribution amplifier to optical signals, and transmit them to the local office 103 using a different physical line 101a (e.g., an optical fiber instead of a coaxial cable) for further processing.

In the illustrated example, the premises 102a may be outside of the wireless coverage area of a wireless service provider's network device, such as tower 301c. The user at that premises, however, may use (or install if needed) a wireless service extension device 313, which may include a local antenna and amplifier, for the wireless service. The wireless service extension device 313 may transmit and receive at the same wireless frequencies used by the wireless service, but at a smaller power level. The user's wireless device 116 may communicate with the wireless service extension device 313, and the wireless service extension device 313 may transmit corresponding signals on to the line 310. To avoid interfering with the other traffic that is already on the line 310, the wireless service extension device 313 may shift the frequencies of the wireless signals to available portions of the spectrum on the wired lines 310. So, for example, if an LTE service used the 750 MHz frequency for upstream traffic (e.g., from a client to a server), but that frequency is already used on the wired line 310 to carry downstream signals, devices such as the wireless service extension device 313 may shift the upstream signals from the wireless 750 MHz to an upstream frequency on the wired line 310, such as 50 MHz. Notably, this frequency shifting need not decode or interpret the actual signal. Instead, the received wireless frequency can simply be repeated and shifted for transmission on the wired network, as-is, such that in the time between the wireless service extension device 313 receiving an upstream wireless signal and transmitting the shifted version, the wireless service extension device 313 device does not decode the wireless signal or any data modulated on to the signal. Indeed, the wireless service extension device 313 need not even contain a decoder needed to decode data from the upstream signal—it may simply pass this signal, as-is, on a different carrier frequency.

These shifted upstream signals may traverse the wired network, passing through distribution tap 303a, amplifier 312 and optical fiber node 302, and may be received at the local office 103. At the local office 103, an optical termination device 314 may receive the signals and supply them to a number of interfaces, such as a DOCSIS interface 315, LTE interface 316 and whitespace interface 317. These interfaces may each filter the signals to isolate the particular frequencies of interest, shifting them as needed (e.g., shifting the LTE signals to undo the shifting that was done by the wireless service extension device 313). Alternatively, this filtering and shifting may be done by the optical termination device 314.

Downstream signals may be handled in a similar fashion. The LTE interface 316 may shift downstream signals from an original wireless frequency to an allocated wired frequency available on the line 310, and that signal may be combined by the optical termination device 314 for downstream transport through the network to the premises 102*a*.

Figure 3C:
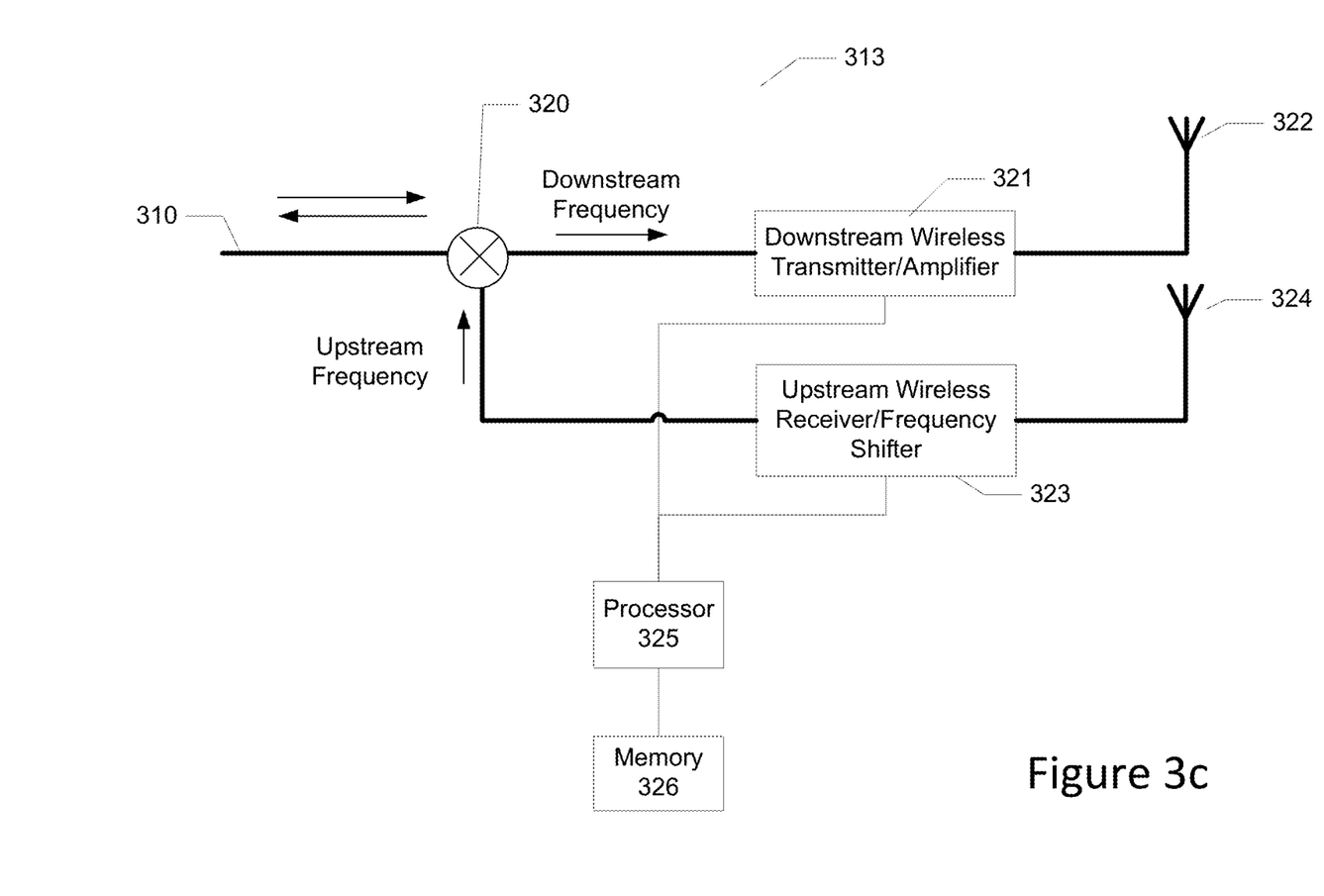
FIG. 3c illustrates an example local amplifier.

FIG. 3*c* illustrates example components of the wireless service extension device 313. As illustrated, the wireless service extension device 313 may include a frequency splitter 320 configured to separate upstream and downstream frequencies, and supply the downstream frequency (or frequencies) to a downstream wireless transmitter/amplifier 321, and upstream frequency (or frequencies) to an external device in the network (discussed further below). The downstream wireless transmitter/amplifier 321 may be configured to transmit the downstream frequency wirelessly via antenna 322, for reception by local wireless devices such as LTE cell phones. This transmission may include amplification of the signal as well.

The wireless service extension device 313 may also include an upstream wireless receiver/frequency shifter 323. The upstream wireless receiver/frequency shifter 323 may receive wireless transmissions, such as from local LTE cell phones, via antenna 324 (which may be the same antenna as antenna 322), and can transmit them on the line 310. Depending on the frequency allocation on the line 310, this upstream transmission may be shifted by the frequency shifter 323 to occupy a different frequency band. For example, if the upstream transmission on the wireless network uses 740 MHz, but that frequency on the wired network is reserved for downstream transmissions, then the received 740 MHz signal may be shifted in frequency (or downconverted) to occupy a different frequency band, such as 40 MHz, that is otherwise unused or available on the wired network for upstream transmissions. This shifting however, need not actually decode or otherwise intelligently process the upstream signal. It can be a basic shifting of the received signal and retransmission, as received, but on a different frequency.

The wireless service extension device 313 may operate under the control of processor 325, which may execute instructions stored on a computer-readable medium, such as RAM 326. The processor 325 may control the wireless service extension device 313's settings, changing parameters such as the amount of amplification to use by the amplifier 321 and/or the upstream receiver/frequency shifter, the frequency at which to transmit the downstream and/or upstream signals, the frequency at which the receiver 323 should receive wireless signals, etc.

Figure 4A:
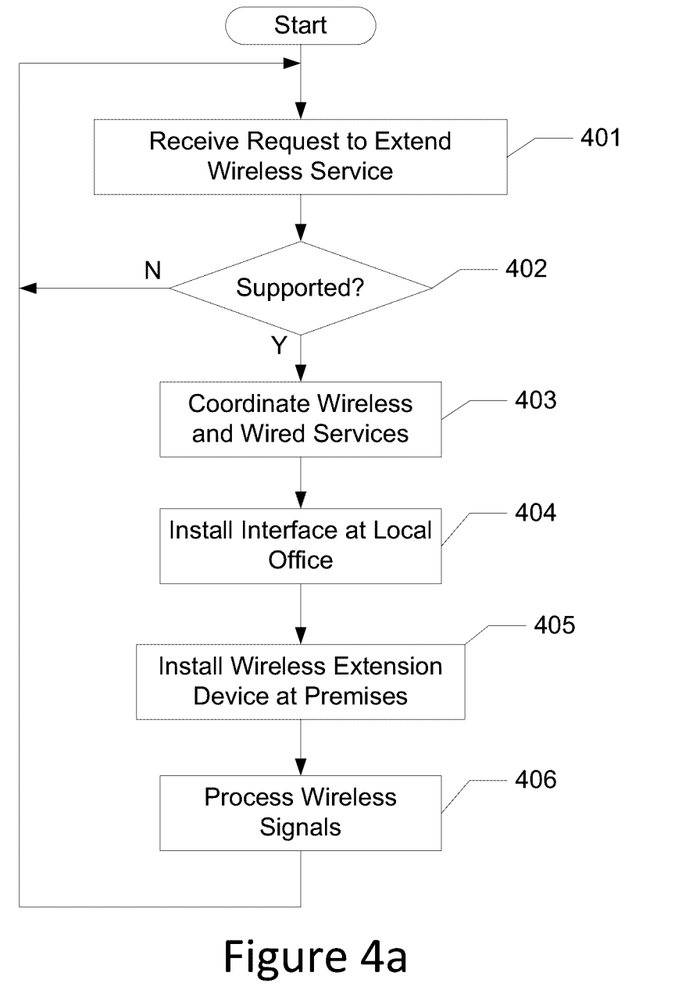
FIGS. 4a & b illustrate example methods for handling wireless signal intrusions in a wired network.

FIG. 4 illustrate example methods for using the features described herein. In step 401, a computing device, such as application server 107 for a wired network, may receive a request from a user to extend a wireless service using a wired connection. The request may identify the user (and/or a wireless device), a wireless service provider on which the wireless device receives wireless service (e.g., a cell phone number or other unique identifier), and an identifier of the user's account with the wireless service (e.g., an account number, cell phone number, etc.).

In step 402, the wired network server may determine whether the wired network can support the requested wireless service for the requesting user. This determination may be based on the available bandwidth on the wired network (e.g., in view of existing customer usage, to determine if one or more available frequencies or bandwidth channels can be used to carry the wireless data), the user's account status with the wired network, the wiring from the premises 102*a* to the hub (e.g., the bandwidth(s) that can be successfully transmitted), and any other desired factor.

If the wireless service cannot be supported, then the process concludes for the current request, and returns to step 401 to await the next request. However, if the wireless service can be supported, then in step 403, the wired network server may coordinate with the wireless network to carry the wireless service's data over the wired network for the requesting user. This coordination may involve an exchange of messages. The wired network server may transmit a message identifying the requesting user and his/her account identifier, and the wireless network server may transmit a response message identifying details of the wireless service that are pertinent to the requesting user's service. For example, these details may include the frequencies used by the user's wireless device for transmitting and receiving wireless service data, the signal strengths used, and any other desired details.

The exchange of messages may further identify the manner in which the wired network and wireless network will interface with each other. For example, the wired network server may provide location information to indicate a geographic location of the local office 103 or location in the wired network where the wireless provider is permitted to install an interface, and details about the connections and resources available at the location 103 to support the wireless provider's interface device.

The coordination may further include updating a wireless service provider's database to indicate that the requesting user's wireless device is reachable through the wired network's local office 103. This may include, for example, indicating that the location of the wireless device as being the premises 102*a*, and that the cell towers 301*a-c* need not bother attempting to reach the wireless device. The coordination may also include allocating upstream and/or downstream bandwidth on the wired line 310 to accommodate the wireless service's signals.

In step 404, the wired (or wireless) service provide may install one or more interface computing devices at the local office 103. As noted above, the interface device may receive the wired network signal, and isolate the portion carrying the wireless service's signal. For security purposes, the wired network service provider may prefer to install its own filter to isolate the wireless service's signal and shift it to undo the shifting done by the wireless service extension device 313, and can provide the wireless service interface with just a modulated signal identical to the signal originally received from the wireless device by the wireless service extension device 313. Similarly, any other wireless service provider may install its own interface equipment at the wired network location 103.

In step 405, the wireless or wired service provider may install or activate a device, such as a wireless service extension device 313 at the premises 102*a*, and configure it to use the specified upstream/downstream frequencies agreed upon in the coordination 403.

As part of using the wireless service extension device 313, and if not already done in the coordination 403, the wireless service extension device 313 may also be registered with a server computer for the wireless service provider (e.g., an LTE cellular telephone company). This registration may include providing information to the server identifying the geographic location (e.g., GPS coordinates, street address, etc.) at which the wireless service extension device 313 was installed and the user(s) who are expected to be using the wireless service extension device 313 to communicate using the wireless service. Providing this information to the wireless service provider may allow the wireless service provider to prepare to receive communications from the identified user(s) from the wired connection 310 instead of (or in addition to) the wireless facilities of the wireless service provider. The information may be used for mediation by the server or service provider, such as granting a discount to a wireless user who permits his/her wireless signals to traverse over his/her wired network connection Then, in step 406, the wireless service's signals may be processed at the local office 103 in the wired network via the interface 320. For example, upstream signals that were received and transmitted by the wireless service extension device 313 may ultimately be received at the interface 316, which can then supply the signals (or the underlying data) to the wireless network's servers. Downstream signals in the wireless network may be supplied from the interface 316 to the optical interface 314, and transmitted on the line 310 (at a shifted frequency if desired to avoid existing network traffic on the line 310), and the wireless service extension device 313 may re-shift the frequency and locally broadcast the wireless signal for reception by the user's wireless device.

Figure 4B:
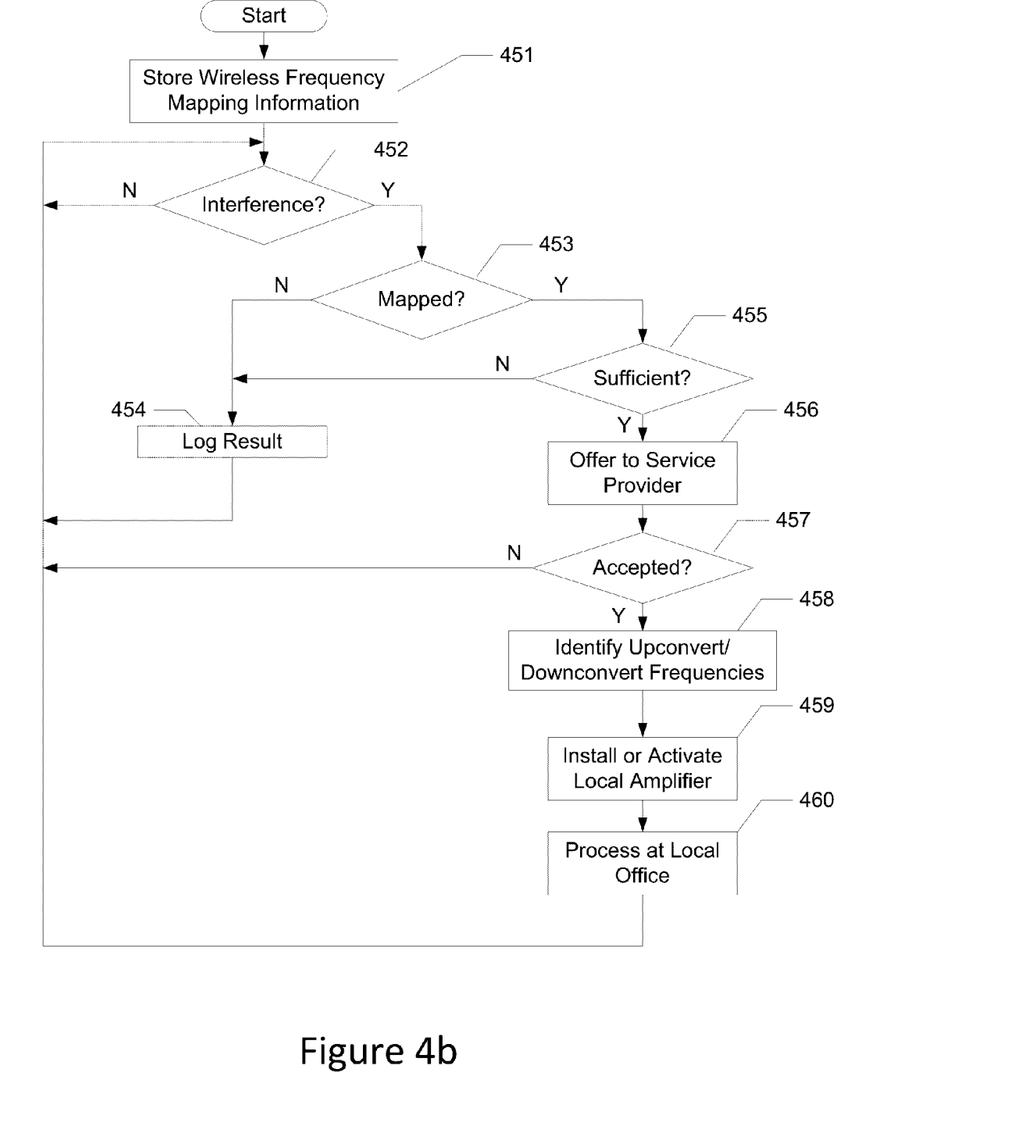

The FIG. 4a method is one approach that began with a user request to extend wireless service to a premises on the wired network. In other embodiments, the wireless service may be extended in response to a determination that the wired network is already receiving the wireless service signals through, for example, leaks in the wired network's lines 310. FIG. 4b illustrates an alternative embodiment, in which the method may begin with the wired network detecting an intrusion signal or interference, and subsequently determining if this intrusive signal may be of use to another wireless network.

In step 451, a computing device managing the wired network 310 may initially store a database identifying wireless frequencies that are in use in the geographic area of the wired network 101. Multiple different databases may be stored, corresponding to different geographic portions of the network 101. For example, a database for the wired network in a first neighborhood may indicate that a first wireless service provider is using the 740 MHz frequency for upstream transmissions and 750 MHz for downstream transmissions, and that a second wireless service provider is using 900 MHz for a duplexed transmission channel. The table below illustrates one such example:

| Frequency | Service Provider | Service Provider Contact | Service Signal Requirements |
|---|---|---|---|
| 740 MHz | LTE A | Address A | 50 dB signal strength 6 pm to midnight weekdays |
| 750 MHz | LTE A | Address A | 100 dB signal strength all times |
| 900 MHz | LTE B | Address B | 50 ms response time for messages |

The database may identify other information pertinent to the listed service as well. For example, the database may identify the service provider by identifier or name, and can identify an address (e.g., an Internet address, website, email, phone number, post office mailing address, etc.) at which the service provider may be reached. The database can also identify one or more service signal requirements. For example, the particular service may require a certain minimum guaranteed bandwidth, or a maximum allowable bandwidth. The service can require a certain minimum wireless signal strength (e.g., in dB). The service can require a certain amount of latency for delivery of data, and may identify times of day for the various requirements (e.g., guaranteeing higher bandwidth levels during peak hours). The wireless frequency map may also be continuously updated as frequency use changes in a geographic area, such as through the addition of new services, new wireless towers or capabilities, etc. The database may further maintain other information useful for the use of the spectrum. For example, the database could identify different times, such as times of day, days of year, etc., during which the various characteristics are applicable. The database could record weather and temperature during those times, as that information may be used to help predict the behavior of terrestrial RF transmissions. For example, the database could indicate that a stronger transmission strength is needed for a frequency during the warmer months of the year. A computing server can update this information according to a predetermined schedule.

In step 452, the computing device may determine whether harmful interference has been received at any node in the network. The normal transmission of signal along the wired line may include signal strength measurement devices located, for example, at the distribution tap 303a, the local office 103, or any other location in the network at where a signal can be detected on the line. If a received signal strength is determined to contain signals in an undesired frequency beyond a predetermined noise level minimum, then in step 453 the device may consult the wireless frequency database to determine whether the unwanted interference is at a frequency listed in the database.

If the frequency is not listed in the database, then in step 454, the device may update an interference log data file to note the detected frequency, its time of detection, and its strength. The interference log may be useful if, at some point in the future, a new wireless service is installed, and if an owner of the computing device wishes to consider whether its existing wire plant is sufficient to help extend the wireless network coverage area.

If the frequency is listed in the database, then in step 455, the device may determine whether the detected interference will be sufficient to satisfy the requirements of the service. For example, if the service requires a certain minimum signal strength for certain time periods of the day, then the device may check its interference log to determine whether the detected interference will be sufficient to satisfy the service's requirements. If it is not sufficient, then the device may return to step 454 and log the detected interference. Logging this information may be useful, for example, if the service requires a week's worth of continuous signal reception above a certain threshold—the computing device may use the log to determine whether a week's worth of the signal has yet been received.

If the detected interference is deemed sufficient for the service, then in step 456, the computing device may deliver an offer to the service provider, offering to extend that provider's wireless range using the wired network at the interference location. This offer may be made by sending a service extension offering message to the service provider at the service provider contact listed in the wireless database. The service extension offering message can be sent in a variety of formats (e.g., an email message, a telephone instant message, a voice phone call, a written letter, etc.) depending on the contact address, and can contain a variety of data regarding the detected interference. For example, the service extension offering message may identify the frequency at which the interference was detected, its duration/history and its signal strength. The message may also identify service parameters that the computing device (or its owner) is willing to offer. For example, the computing device may wish to only devote a certain maximum amount of computing resources for processing the service provider's messages, and the message may indicate this maximum. The message may also identify the geographic area in which the interference was detected. For example, the message can identify the street address(es) serviced by the node that received the interference.

In some situations, the detected interference might only be sufficient for a portion of the service provider's services. For example, a particular node may receive interference in the upstream frequency used by service provider LTE A, but not in the downstream frequency used by that service provider. In this situation, the computing device may make an offer to just carry the upstream data for the service provider. In such a situation, the offer may indicate that the offered extension only encompasses the upstream signals for the service provider. Alternatively, enhanced services may be offered to the user if the user is located within an acceptable coverage area of the antenna. For example, a user who is located at the premises and using a wired connection to carry wireless data for a wireless service may be permitted to transmit or receive a larger amount of data than when using just a wireless connection to carry the wireless data.

In step 457, the device may determine whether the service extension offer was accepted by the service provider. If it is accepted, then in step 458, the computing device may determine how to map the wireless service's data onto the wired network's existing frequency map, similar to that noted above in the FIG. 4a example, to identify one or more available frequencies that can be used to carry the wireless service's data. For example, the wired network may be configured to use the 5-42 MHz frequency range for upstream transmissions, and the 50 MHz to 860 MHz range for downstream channels. If a nearby wireless service is receiving upstream signals from users' cell phones in the 740 MHz range, then those upstream signals cannot be permitted to traverse the wired network at 740 MHz, as that frequency is reserved for downstream use. The computing device may reassign the wireless upstream channel from its original frequency (e.g., 740 MHz) to an available upstream channel on the wired network, such as 10 MHz. In operation, then, the received wireless signals at the 740 MHz wireless frequency may be transmitted upstream on the wired network at the 10 MHz wired frequency.

In step 459, a wireless service extension device 313 may be installed at the premises 102a. Of course, this may be performed by a human technician, the homeowner, or any other desired individual. As noted above in the FIG. 4a example, the local amplifier itself may be configured (in advance or upon installation) to receive and/or transmit at the wireless frequency, and may perform up/down conversions to transmit/receive signals on the wired network. Using the example above, the local amplifier may be configured to receive the local wireless interference at 740 MHz, and transmit the signal at 10 MHz on the wired network. The wireless service extension device 313 may be a computing device storing a database associating wired frequencies with corresponding wireless frequencies, and identifying parameters for their reception/transmission (e.g., signal strength). The installation may also include the coordination 403 discussed above. Additionally, in some embodiments, the premises 102a may already possess the amplifier and step 459 may merely involve an activation of the already-installed equipment and/or functionality. This may occur, for example, if the extension capability is previously installed as part of a gateway 120 that the user uses for accessing the external wired network 101.

Similarly, for downstream signals, the local amplifier may also include a wireless transmitter, and may be configured to receive the downstream signal on the wired frequency, amplify it, and broadcast it wirelessly for local reception at the premises 102a. Due to relevant regulations, this local wireless transmission may be made at a low power level, so as to only be of use within the premises 102a.

In step 460, the extended wireless service's signals may be processed at the local office 103, as discussed above in step 406. The processing may involve isolating the datastream from the wired channel that was mapped to the wireless service, and delivering that datastream to one or more computing devices that are configured to process the wireless service's data. For example, a 4G/LTE cellular telephone service may include an interface server at the local office 103, configured to receive 4G/LTE signals from the optical receiver at the local office, and deliver them on to the 4G/LTE network's servers. Similarly, other wireless services, such as a whitespace service that uses local wireless frequencies, can have a similar interface at the local office 103 to receive and transmit its wireless data over the wired network of the local office 103.

Figure 5:
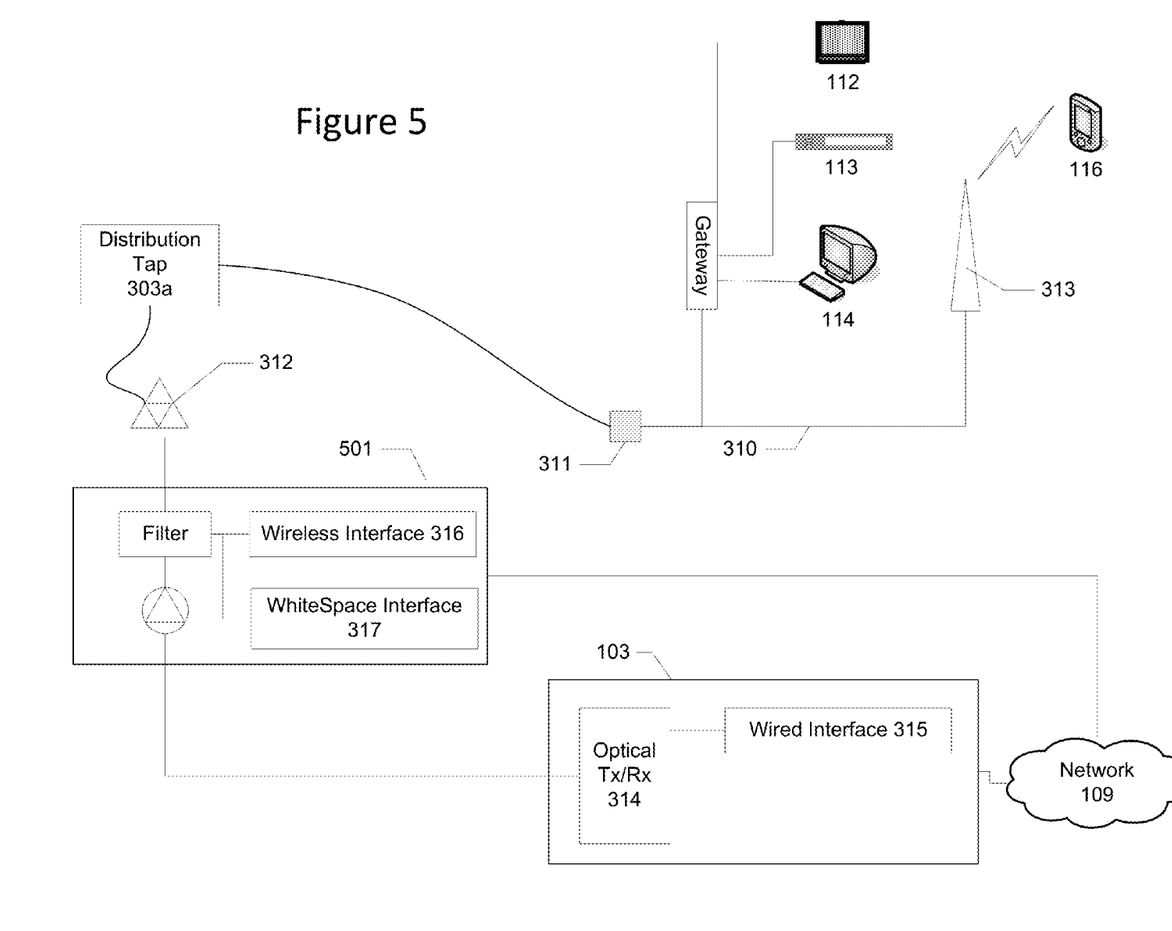
FIG. 5 illustrates an alternate embodiment of the FIG. 3b system.

In the FIG. 3b example, the wireless network provided an interface 316 at the local office 103 of the wired network to receive and process the wireless signals. Alternatively, this interface need not be located at the same local office 103 as the wired network's data interface, and instead may be located elsewhere in the network. FIG. 5 illustrates an example in which an office 501, separate from the wired network's local office 103, is provided along the wired network to receive and handle wireless transmissions.

Figure 6:
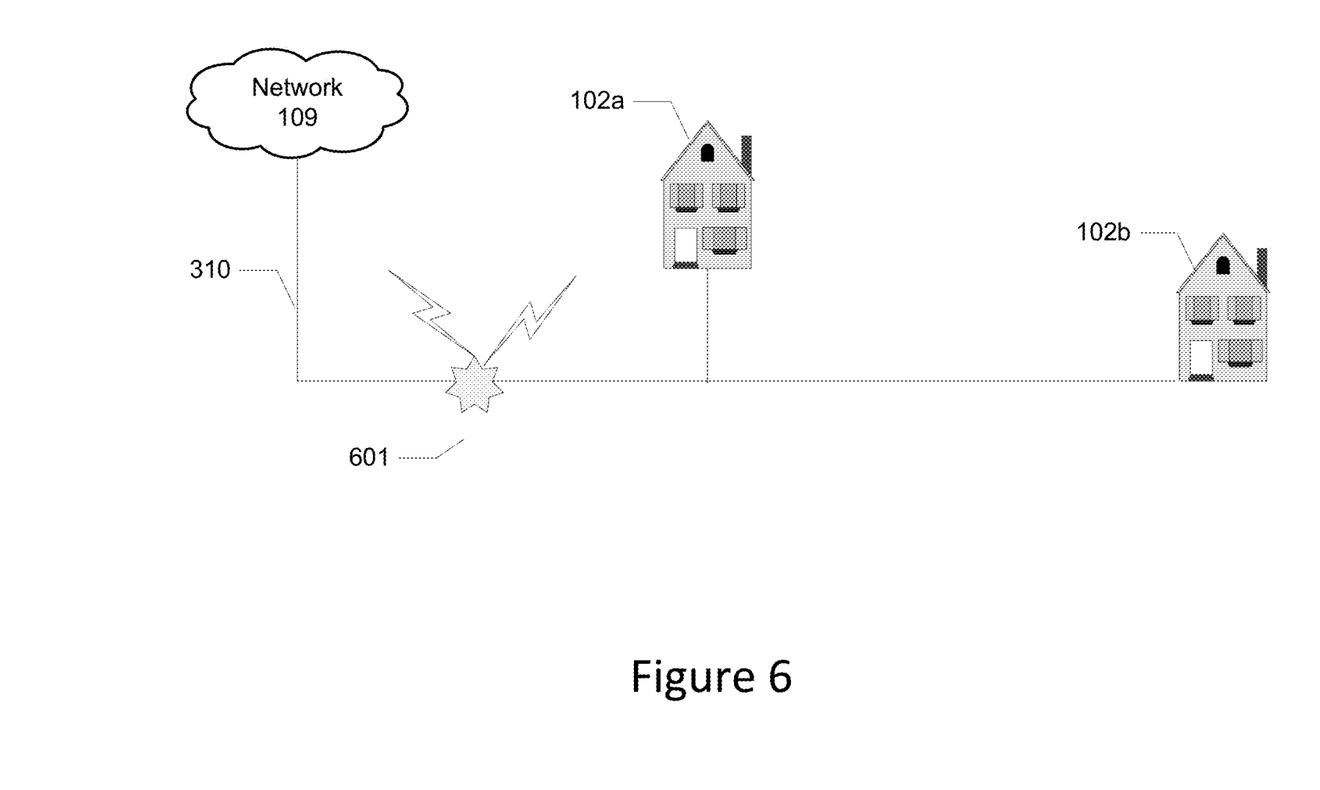
FIG. 6 illustrates an example wired network with wireless intrusion.
Figure 7:
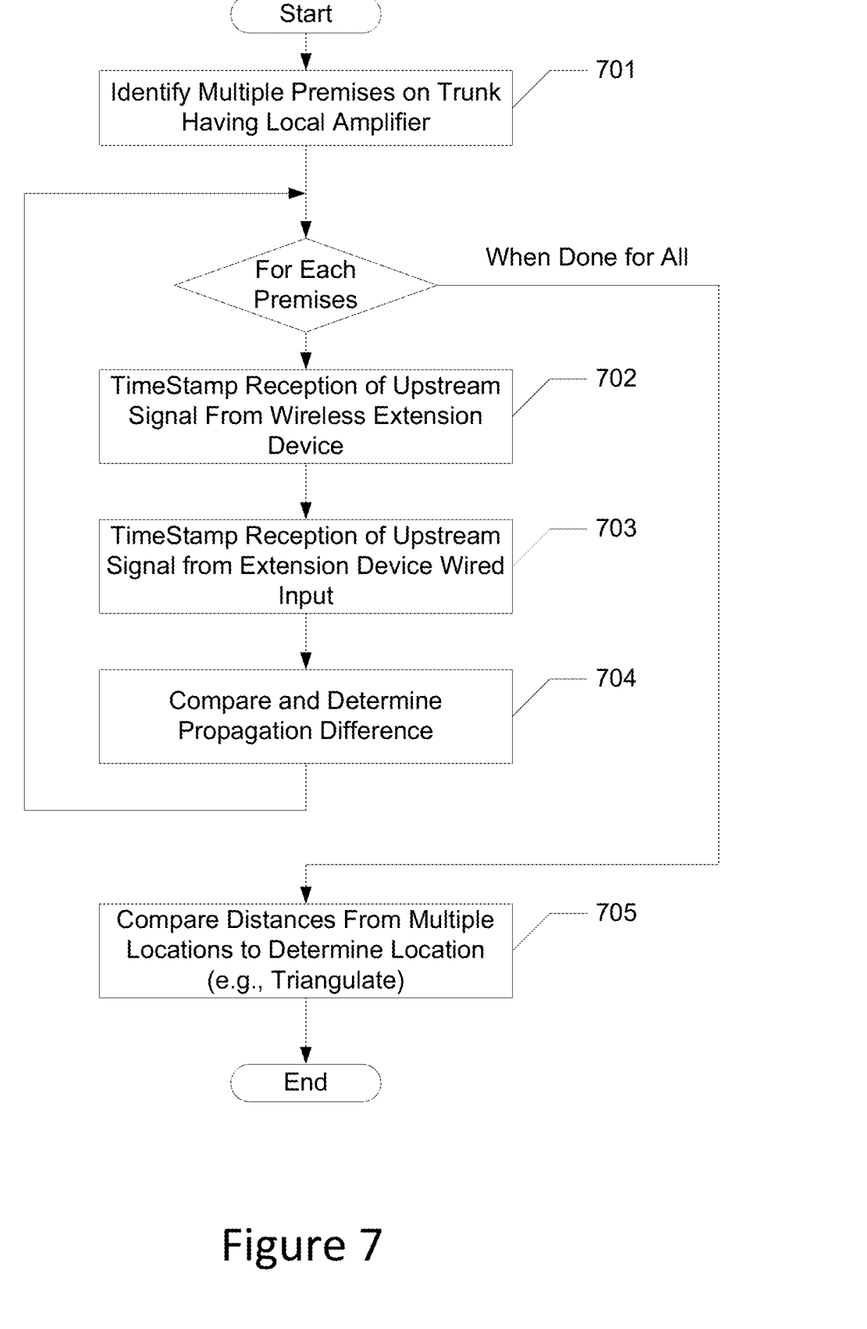
FIG. 7 illustrates an example method of identifying a geographic location of a interference in a wired network.

In some embodiments, multiple premises may receive the wireless network's signals from a leak. As illustrated in FIG. 6, two homes premises 102a and 102b may receive interference from the local wireless network because they are both coupled to the same line segment containing the leak 601. In such a situation, wireless service extension devices 313 may be installed in both premises 102a,b, and wireless service extension devices 313 may be used to help triangulate the location of the leak 601. FIG. 7 illustrates an example method by which this triangulation may be performed. In step 701, a processor (e.g., processor 201 in a server at the local office 103) may identify premises that have local amplifiers installed for a common wireless service, and who are connected to a common wire line 310 or trunk.

For each identified premises, the local amplifier processor 325 may then perform a loop to identify the estimated distance between the identified premises and the leak 601. In general terms, the triangulation may rely on the fact that a single wireless transmission from a wireless device at the premises 102a may be received by the local amplifier 308 twice: once over the upstream antenna 324, and again on the line 310 via the leak 601. By comparing the time difference between when this signal was received, the wireless service extension device 313 may determine an approximate distance between the leak 601 and the premises 102a. Doing this for more than one premises may help narrow down the location of the leak 601.

The loop begins in step 702 with identifying a timestamp for when an upstream transmission was received from a wireless device at the premises. Any upstream transmission, such as a particular packet or burst sent from the user's wireless device, can be chosen for this purpose, as long as the burst is uniquely identifiable.

Then, in step 703, the local amplifier processor 325 may also determine when the same upstream transmission (e.g., the same burst or packet) was received by the wireless service extension device 313 via the wired connection on line 310. This may be detected using, for example, a detection circuit connected to the line 310 to the left of the filter 320 in the local amplifier shown in FIG. 3c. This upstream detection circuit may detect communications at the wireless service's upstream frequency that enter the line 310 via the leak 601 and propagate down to the local amplifier 313.

In step 704, the wireless service extension device 313 may then determine a difference between the two times, and this time difference may be considered to be due to the propagation of the signal between the leak 601 and the wireless service extension device 313. Using a velocity of propagation constant (which can be based on the physical medium used for the line 310), this time difference can then be converted to an estimated linear distance from the wireless service extension device 313 to the leak 601. The local amplifier may then report this distance value back to a processor at the central office 103 (or any other processor that is configured to collect the data).

The process can then return to repeat the loop for the remaining premises identified in step 701. In some instances, the steps 703 and 704 might not be possible for a particular premises if, for example, the wireless device's transmission is not strong enough to reach leak 601 and propagate back via the wire 310. The loop may simply skip those premises. The loop may also stop after a predetermined maximum number of distances is determined (e.g., after 3 premises and distance pairs are identified).

When all desired premises have been processed, then in step 705 the processor at the central office 103 may use the known geographic locations of each premises (which may be identified as part of the registration described above) and the estimated distance to the leak 601 for each to triangulate and determine the likely location of the leak 601.

The example above used the wireless device's upstream transmission as the signal for comparing propagation times. In another embodiment, the intruding downstream signal from the wireless service may be used. In this other embodiment, which generally would operate as illustrated in FIG. 7, the timestamps in steps 702 and 703 would be for when two different local amplifiers 308 at two different premises received the same downstream packet or burst coming over the wired line 301. The time difference would represent the additional propagation needed to reach the premises that received the packet or burst last. For example, if premises 102b received the burst 100 ms later than premises 102a, then the processor can determine that premises 102 is 100 ms (in propagation time) farther from the leak than premises 102a.

Once a leak 601 has been located, the wired service provider may make a determination as to whether to repair the leak. In some situations, if enough local amplifiers have already been installed to extend the wireless service, the wired service provider may decide to leave the leak alone, or to even add wireless receiving antenna structures to help take advantage of the local amplifier infrastructure. The wired network provider may offer an extension service to a wireless service provider, and decide to leave the leak alone if the wireless service provider agrees to subscribe to a wireless extension that uses the wired network.

As an additional feature, the system herein may be used to expand DOCSIS (Data Over Cable Service Interface Specification) station maintenance messages to carry small amounts of information beyond that specified in the DOCSIS format. For example, a DOCSIS MAP, RNG-REQ or RNG-RESP message may be used, but the payload for the message may deviate from the originally-specified format, and may be modified to carry alternative information instead.

The features described herein are merely examples. It will be understood that the features may be combined, separated, rearranged and omitted as desired to suit a particular installation, and still be within the scope of this disclosure. The true scope of this patent is only limited by the claims that follow.

The invention claimed is:

1. A method, comprising:
   determining, by a computing device, that a signal strength of a downstream wireless signal received at a user network is below a predetermined minimum strength;
   identifying, by the computing device, a wired network connected to the user network;
   determining that the wired network is able to receive wireless transmissions in a frequency corresponding to a downstream wireless signal frequency;
   determining that the downstream wireless signal is interfering with wired communications on the wired network, and is being received via a leak in the wired network;
   determining to offer a wireless extension service to a wireless service provider using the leak in the wired network;
   responsive to receiving the downstream wireless signal over the wired network, retransmitting the downstream wireless signal wirelessly to the user network; and
   receiving an upstream wireless signal, and retransmitting the upstream wireless signal over the wired network.

2. The method of claim 1, wherein the downstream wireless signal comprises a cellular telephone signal.

3. The method of claim 1, further comprising amplifying the downstream wireless signal prior to retransmitting it wirelessly to the user network.

4. The method of claim 1, further comprising shifting a frequency of the upstream wireless signal to correspond to an available upstream frequency on the wired network.

5. The method of claim 1, further comprising:
   storing a database identifying frequencies used by wireless service providers across a plurality of geographic areas;
   determining that wireless interference is degrading a wired network signal in a first geographic area; and
   determining whether the wireless interference corresponds to any of the frequencies in the database.

6. The method of claim 1, further comprising:
   installing a wireless network interface on the wired network, wherein the wireless network interface is configured to retrieve upstream wireless signals from the wired network at a different frequency from which they were originally wirelessly transmitted.

7. A network method, comprising:
   receiving, by a computing device at a premises coupled to a wired network, a wireless signal on a first frequency;
   determining, by the computing device, a second frequency that is unused on the wired network; and
   shifting a frequency of the wireless signal from the first frequency to the second frequency and transmitting a resulting frequency shifted wireless signal onto the wired network, wherein the computing device is configured to cause the wireless signal to be amplified before modulating of the wireless signal for transmission on the second frequency.

8. The method of claim 7, wherein in a time between the receiving and the transmitting, the computing device does not decode data from the wireless signal.

9. The method of claim 7, further comprising using the frequency shifted wireless signal to extend a wireless service to a geographic area not covered by a provider of the wireless service.

10. The method of claim 7, further comprising:
receiving, by the computing device, a downstream signal over the wired network; and
shifting a frequency of the downstream signal and transmitting a resulting frequency shifted downstream signal as a wireless signal proximate to the computing device.

11. The method of claim 10, further comprising using the computing device to carry cellular telephone network signals over the wired network as frequency-shifted versions.

12. The method of claim 11, wherein using the computing device to carry cellular telephone network signals over the wired network as frequency-shifted versions does not include decoding data carried in the cellular telephone network signals by the computing device.

13. A computing device, comprising:
a wired signal interface;
a wireless signal interface; and
a processor, configured to perform the following:
determine an available upstream frequency on a frequency spectrum of the wired signal interface;
receive a wireless signal on the wireless signal interface;
cause a frequency shift to be performed on the wireless signal received on the wireless signal interface to the available upstream frequency; and
cause a carrier signal to be modulated at the wired signal interface at the available upstream frequency of the wired signal interface to match a modulation of the wireless signal received on the wireless signal interface,
wherein the processor is further configured to cause the wireless signal received on the wireless signal interface to be amplified before modulating the carrier signal at the available upstream frequency.

14. The computing device of claim 13, wherein the processor is further configured to modulate at least a portion of the carrier signal at the available upstream frequency without decoding data carried in the wireless signal received on the wireless signal interface.

15. The computing device of claim 13, wherein the processor is further configured to:
receive a downstream signal at a frequency on the wired signal interface; and
modulate a wireless signal at an antenna to match a modulation of the downstream signal.

16. The computing device of claim 13, wherein the processor is further configured to transmit or receive wireless cellular telephone signals as frequency-shifted signals over the wired signal interface.

17. The computing device of claim 13, wherein the processor is further configured to receive an upstream signal at an upstream cellular telephone frequency, shift a frequency of the upstream signal from the upstream cellular telephone frequency to an upstream cable modem frequency, and transmit a resulting frequency shifted wireless signal at the upstream cable modem frequency over the wired signal interface.

* * * * *